C. JARECKI,
Assignor to Jarecki Manufacturing Co.
PISTONS FOR DEEP-WELL PUMPS.
No. 7,792. Reissued July 17, 1877.
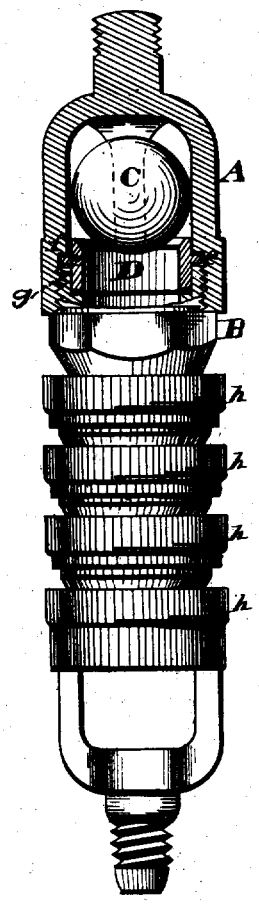
WITNESSES
Edw. Nottingham
A. M. Bright.
INVENTOR
Charles Jarecki.
By Seagett & Seagett.
ATTORNEYS
N. PETERS, PHOTO-LITHOGRAPHER, WASHINGTON, D. C.

UNITED STATES PATENT OFFICE.

CHARLES JARECKI, OF ERIE, PENNSYLVANIA, ASSIGNOR, BY MESNE ASSIGNMENTS, TO JARECKI MANUFACTURING COMPANY.

IMPROVEMENT IN PISTONS FOR DEEP-WELL PUMPS.

Specification forming part of Letters Patent No. 83,968, dated November 10, 1868; Reissue No. 7,792, dated July 17, 1877; application filed January 31, 1877.

*To all whom it may concern:*

Be it known that I, CHARLES JARECKI, of Erie, in the county of Erie and State of Pennsylvania, have invented a new and Improved Piston for Deep-Well Pumps; and I do hereby declare that the following is a full, clear, and exact description thereof, which will enable those skilled in the art to make and use the same, reference being had to the accompanying drawing, forming part of this specification.

This invention relates more particularly to oil-wells, which are usually sunk deep, and which require the piston and working parts of the pump to be of the most permanent and durable character; and the invention consists in the method of holding the seat in the piston, or, briefly, in so forming the separate valve-seat with relation to the adjacent parts that in securing or otherwise attaching those parts of the device together, the valve-seat may thereby be clamped between them, and so held securely in place, as will be presently described.

The drawing represents the piston of a deep-well pump, partly in section, showing the seat and ball-valve, and also the hexagonal section beneath it, by which that section of the piston may be turned off with a wrench for the removal of the leather cups.

In the instance illustrated, A is the crown of the piston, which screws onto the hexagonal section B, inclosing the valve and seat, as seen in the drawing. C is the valve, and D is the valve-seat.

The valve-seat shown is a longitudinal section of a tube with a projection, *e*, extending from its outer circumference, by which the seat is held in place between the shoulder *f* on the crown and the top of the section B, the construction being such that the valve-seat is securely clamped between the adjacent parts of the piston by simply securing those adjacent parts together.

It should be observed that I designate by *e* that portion which extends beyond the valve-seat proper, and projects between adjacent separable parts, whereby the valve is clamped in place.

*g* represents the top of B. The seat D drops loosely into its place, its upper end being formed to suit a section of the ball-valve.

As these seats have hitherto been put in they have soon become useless, entailing much expense and trouble thereby.

By my method of forming and attaching them they answer all purposes, as all former objections are obviated by this arrangement.

As these pistons have usually been made it has been found extremely difficult to remove the leather cups *h*, when they get worn, for the purpose of renewing them.

By making the section B in the form of a polygon it may be removed with a wrench without the usual griping and damaging of the piston.

In the use of the valve-seat D I do not confine myself to the piston of the pump, as the seat can be used with equal advantage for the lower or check-valve in deep-well pumps, and my claims are intended to embrace such a construction there as well as in the piston.

What I claim as new, and desire to secure by Letters Patent, is—

1. A combined pump piston and valve consisting in the combination, with a valve-seat, the outer edge of which projects and forms an annular bearing for the parts by which it is clamped in place, of a crown or cage constructed with a screw-threaded lower end, and the piston having its upper end screw-threaded to fit the threads of the cage or crown, the two operating to secure the valve-seat in place, the piston being provided or not with a wrench seat or nut, whereby it may be removed when desired, substantially as described.

2. The steel valve-seat D, provided with the concentric collar *e*, adapted to be clamped between the shoulder *f* of the detachable crown A, and the top of the piston-section B, whereby the valve is held rigidly in place, as herein shown and described, for the purpose specified.

CHARLES JARECKI.

Witnesses:
FRANCIS TOURNEY,
EDWARD WALSH.